United States Patent
Middleton, IV et al.

(10) Patent No.: US 10,511,387 B1
(45) Date of Patent: Dec. 17, 2019

(54) RF FREQUENCY CONVERTER WITH SBS EQUALIZATION AND RELATED METHODS

(71) Applicant: Eagle Technology, LLC, Melbourne, FL (US)

(72) Inventors: Charles F. Middleton, IV, Rockledge, FL (US); John R. Desalvo, Satellite Beach, FL (US); Elliott J. Grafer, Melbourne Beach, FL (US); Anthony C. Klee, Melbourne, FL (US); Alexander D. Cramer, Palm Bay, FL (US); George W. Miles, IV, Rockledge, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/280,182

(22) Filed: Feb. 20, 2019

(51) Int. Cl.
*H04B 10/2575* (2013.01)
*H04B 10/516* (2013.01)
*H04B 10/2537* (2013.01)

(52) U.S. Cl.
CPC ..... *H04B 10/5161* (2013.01); *H04B 10/2537* (2013.01); *H04B 10/2575* (2013.01); *H04B 2210/006* (2013.01)

(58) Field of Classification Search
CPC .................................. H04B 10/2575–25759
USPC ................................ 398/115–117, 182–214
See application file for complete search history.

(56) References Cited

U.S. PATENT DOCUMENTS

| | | | |
|---|---|---|---|
| 5,699,179 A | 12/1997 | Gopalakrishnan | |
| 5,710,651 A | 1/1998 | Logan, Jr. | |
| 6,304,369 B1 | 10/2001 | Piehler | |
| 6,535,315 B1 | 3/2003 | Way et al. | |
| 6,535,328 B2 | 3/2003 | Yao | |
| 6,600,593 B2 | 7/2003 | Pedersen | |
| 7,394,331 B2* | 7/2008 | Yeung | H04B 3/145 333/18 |

(Continued)

OTHER PUBLICATIONS

Yi et al. "Polarization-Independent Rectangular Microwave Photonic Filter Based on Stimulated Brillouin Scattering" Journal of Lightwave Technology, vol. 34, No. 2, Jan. 15, 2016; pp. 669-675.

(Continued)

*Primary Examiner* — Li Liu
(74) *Attorney, Agent, or Firm* — Allen, Dyer, Doppelt + Gilchrist, P.A.

(57) ABSTRACT

An RF frequency converter with equalization may include a first E/O modulator configured to modulate an optical carrier signal based upon an RF input signal having a first frequency, and a SBS medium coupled to the first E/O modulator. The RF frequency converter may have a second E/O modulator configured to modulate the optical carrier signal based upon an equalizing function waveform, and a third E/O modulator coupled between the first E/O modulator and the SBS medium. The third E/O modulator may be configured to modulate the optical carrier signal with a reference signal. The RF frequency converter may include an optical circulator coupled to the SBS medium and the second E/O modulator, and a photodetector coupled to the optical circulator and configured to generate an equalized RF output signal having a replica of the RF input signal at a second frequency based upon the reference signal.

21 Claims, 16 Drawing Sheets

(56) References Cited

U.S. PATENT DOCUMENTS

| | | | |
|---|---|---|---|
| 7,623,797 B2 | 11/2009 | Crivelli et al. | |
| 7,813,654 B1 | 10/2010 | Ng et al. | |
| 7,877,020 B1* | 1/2011 | Hayes | H04B 10/50 |
| | | | 398/183 |
| 8,538,270 B2* | 9/2013 | Seidel | G02F 2/002 |
| | | | 372/21 |
| 8,842,992 B2 | 9/2014 | Middleton et al. | |
| 9,287,993 B1* | 3/2016 | Adleman | H04B 10/2575 |
| 9,755,754 B2 | 9/2017 | Schaefer et al. | |
| 2004/0136649 A1 | 7/2004 | Mangir et al. | |
| 2007/0025421 A1* | 2/2007 | Shattil | H04B 10/25752 |
| | | | 375/136 |
| 2014/0270783 A1* | 9/2014 | Prather | H04B 10/25752 |
| | | | 398/115 |

OTHER PUBLICATIONS

Choudhary et al. "High-resolution, on-chip RF photonic signal processor using Brillouin gain shaping and RF interference" Scientific Reports: Jul. 19, 2017; https://www.nature.com/articles/s41598-017-06270-4; pp. 9.

Marpaung et al. "Low-power, chip-based stimulated Brillouin scattering microwave photonic filter with ultrahigh selectivity" Optica 2, 76-83 (2015).

Stern et al. "Tunable sharp and highly selective microwave-photonic band-pass filters based on stimulated Brillouin scattering" Photon. Res. Photon. Res. vol. 2, No. 4, Aug. 2014; pp. B18-B25.

Ge et al. "Passband switchable microwave photonic multiband filter" Scientific Reports 5: Nov. 2, 1995; pp. 9.

Zhang et al. "Microwave photonic filter with reconfigurable and tunable bandpass response using integrated optical signal processor based on microring resonator" Optical Engineering 52(12), 127102 (Dec. 2013); pp. 8.

Zhang et al. "Tunable and reconfigurable bandpass microwave photonic filters utilizing integrated optical processor on silicon-on-insulator substrate." IEEE Photonics Technology Letters 24.17 (2012): 1502-1505.

Song et al "Reconfigurabie and tunable flat-top microwave photonic filters utilizing optical frequency combs" IEEE Photonics Technology Letters 23.21 (2011): 1618-1620.

Zhange et al. "Switchable and Tunable Microwave Photonic Brillouin-Based Filter" IEEE Photonics Journal: vol. 4, No. 5, Oct. 2012; 1443-1455.

Shi et al. "Generation and phase noise analysis of a wide optoelectronic oscillator with ultra-high resolution based on stimulated Brillouin scattering" Optics Express: Jun. 11, 2018; 16113-16124.

U.S. Appl. No. 15/958,397, filed Apr. 20, 2018 Middleton et al.

Mattia Pagani "Microwave Photonic Signal Processing Using On-Chip Nonlinear Optics" https://ses.library.usyd.edu.au/bitstream/2123/14450/2/pagani_m_thesis.pdf. 2016. pp. 272.

* cited by examiner

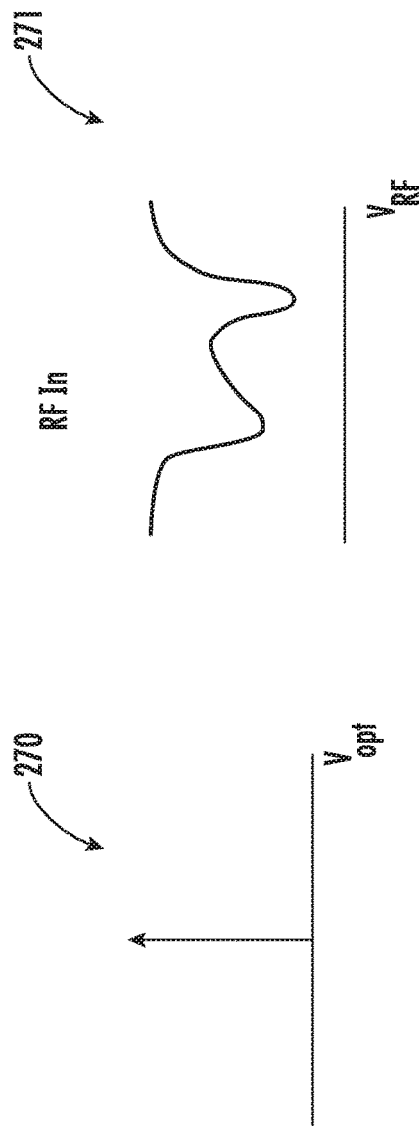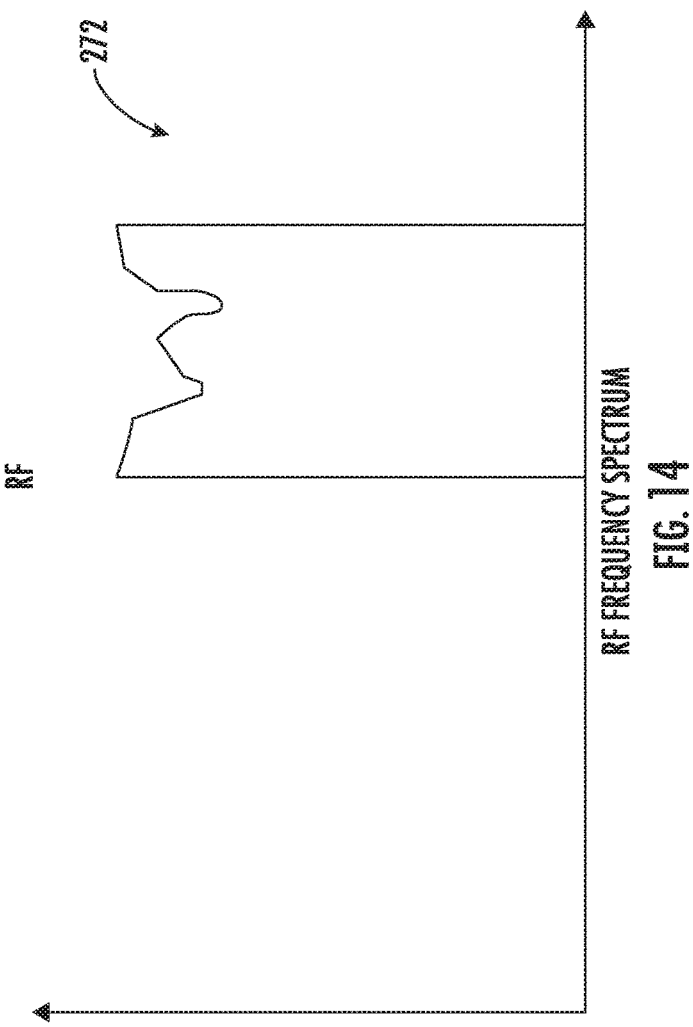
FIG. 13A
FIG. 13B
FIG. 14

RF FREQUENCY CONVERTER WITH SBS EQUALIZATION AND RELATED METHODS

TECHNICAL FIELD

This disclosure relates to radio frequency systems, and more particularly to radio frequency systems for communications, sensing, and other related fields and related methods.

BACKGROUND

Radio frequency (RF) systems often exhibit frequency-dependent gain slope and ripple in their spectral responses. This non-uniform frequency response is inherent to all electronic components. However, other factors can exacerbate the frequency response. For example, these include impedance mismatch, frequency dependent RF components and environmental effects.

Ripple and gain slope ultimately cause errors in data transmission. As a result, a gain flatness metric is often specified for RF systems. By way of example, a gain flatness of +/− 1 dB may be required for frequencies in a 500 MHz bandwidth centered at 10 GHz.

Accordingly, various equalization techniques are often implemented to flatten the frequency response. Typical analog electronic equalizers are static and generally provide an inverse gain slope to what the frequency response of the system is. However, some implementations use dynamic analog electronic equalizers, which are active systems designed to correct voltage standing wave ratio (VSWR) as well as gain slope.

One example equalizer is set forth in U.S. Pat. No. 7,394,331 to Yeung et al., which discloses a programmable passive equalizer. The equalizer is programmable to respond to one or more changes in a signal caused by the communication of the signal through various signal components. The passive equalizer includes a programmable resistor device and a programmable capacitor device arranged in parallel to one another, with the programmable resistor device and the programmable capacitor being arranged to provide an output to a node. An inductor device and a resistor device are arranged in series, with the inductor device and the resistor device also being configured to provide an output to the node.

Generally speaking, electronic equalizer approaches may suffer from various drawbacks. These may include added loss into the system, narrowband response, low resolution, and poor performance at high frequencies. As such, further enhancements may be desirable for RF signal equalization in various applications.

SUMMARY

Generally, an RF frequency converter with equalization may include a first electro-optic (E/O) modulator configured to modulate an optical carrier signal based upon an RF input signal having a first frequency, and a stimulated Brillouin scattering (SBS) medium coupled to the first E/O modulator. The RF frequency converter may comprise a second E/O modulator configured to modulate the optical carrier signal based upon an equalizing function waveform, and a third E/O modulator coupled between the first E/O modulator and the SBS medium, the third E/O modulator configured to modulate the optical carrier signal with a reference signal. The RF frequency converter may include an optical circulator coupled to the SBS medium and the second E/O modulator, and a photodetector coupled to the optical circulator and configured to generate an equalized RF output signal comprising a replica of the RF input signal at a second frequency based upon the reference signal.

In particular, the photodetector is configured to generate the RF output signal based upon the equalization function waveform applied to the RF input signal. The RF frequency converter may also include a waveform generator coupled to the second E/O modulator and configured to generate the equalizing function waveform. The waveform generator may be configured to dynamically vary the equalizing function waveform. The waveform generator may be configured to add an inverse of an RF system frequency response to the RF input signal.

Additionally, the first frequency may be greater than the second frequency. The RF frequency converter may also include an optical isolator coupled between the third E/O modulator and the SBS medium. The RF frequency converter may comprise an optical amplifier coupled between the second E/O modulator and the optical circulator. For example, the RF frequency converter may comprise a laser source configured to generate the optical carrier signal.

One aspect is directed to an RF system comprising an RF antenna configured to generate an RF input signal having a first frequency, and an RF frequency converter with equalization coupled to the RF antenna. The RF frequency converter may comprise a first E/O modulator configured to modulate an optical carrier signal based upon the RF input signal, a SBS medium coupled to the first E/O modulator, and a second E/O modulator configured to modulate the optical carrier signal based upon an equalizing function waveform. The RF frequency converter may include a third E/O modulator coupled between the first E/O modulator and the SBS medium. The third E/O modulator may be configured to modulate the optical carrier signal with a reference signal. The RF frequency converter may comprise an optical circulator coupled to the SBS medium and the second E/O modulator, and a photodetector coupled to the optical circulator and configured to generate an equalized RF output signal comprising a replica of the RF input signal at a second frequency based upon the reference signal.

Yet another aspect is directed to a method for RF frequency converting with equalization. The method may include modulating, with a first E/O modulator, an optical carrier signal based upon an RF input signal having a first frequency, and modulating, with a second E/O modulator, the optical carrier signal based upon an equalizing function waveform. The method may comprise modulating, with a third E/O modulator coupled to the first E/O modulator, the optical carrier signal with a reference signal, and passing a modulated optical carrier signal, from the third E/O modulator, through a SBS medium. The method may further comprise and generating, with a photodetector coupled to an optical circulator, an equalized RF output signal comprising a replica of the RF input signal at a second frequency based upon the reference signal.

BRIEF DESCRIPTION OF THE DRAWINGS

FIGS. 13A-16B are a series of schematic diagrams and respective optical signal diagrams illustrating propagation of the input and pump signals through the RF frequency converter of FIG. 12.

DETAILED DESCRIPTION OF THE EMBODIMENTS

Figure 1:
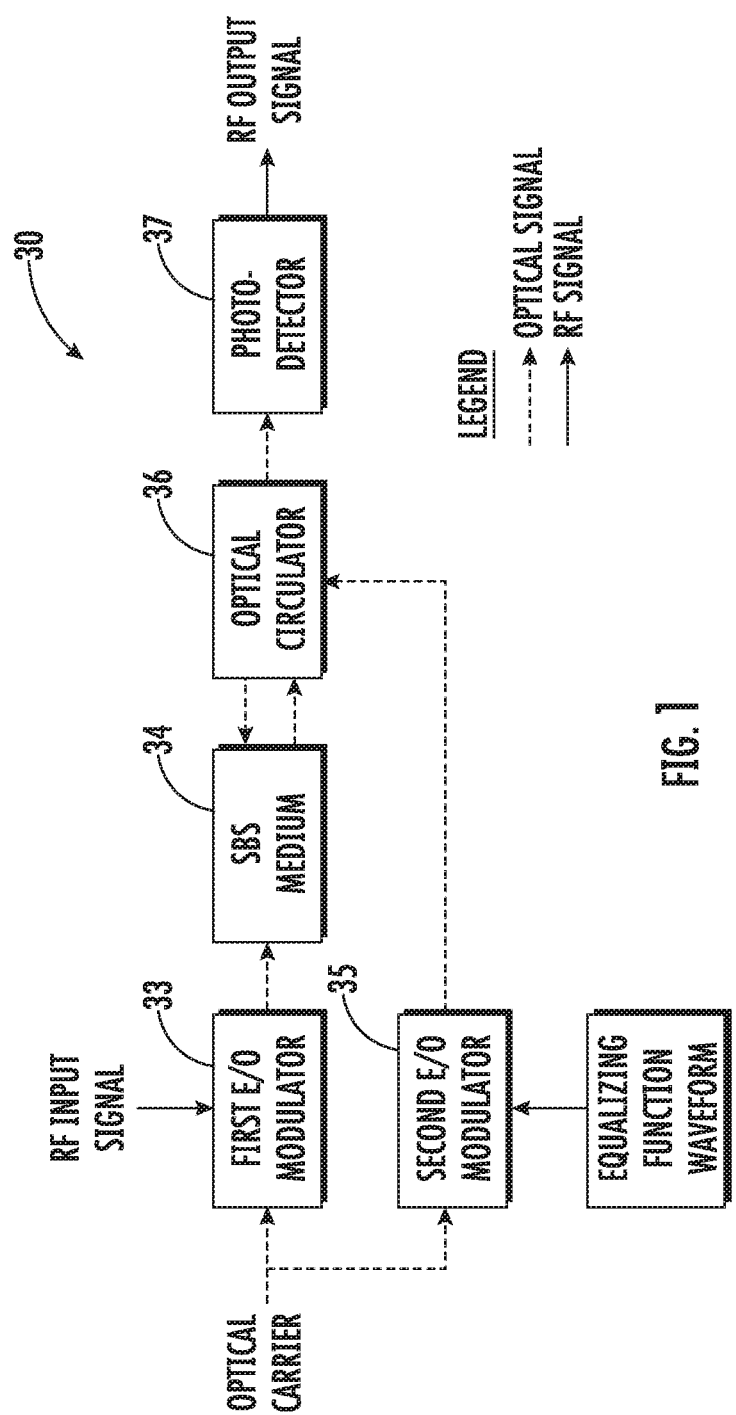
FIG. 1 is a schematic block diagram of an RF photonic equalizer, according to an example embodiment.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and base 100 reference numerals are used to indicate similar elements in alternative embodiments.

Figure 2:
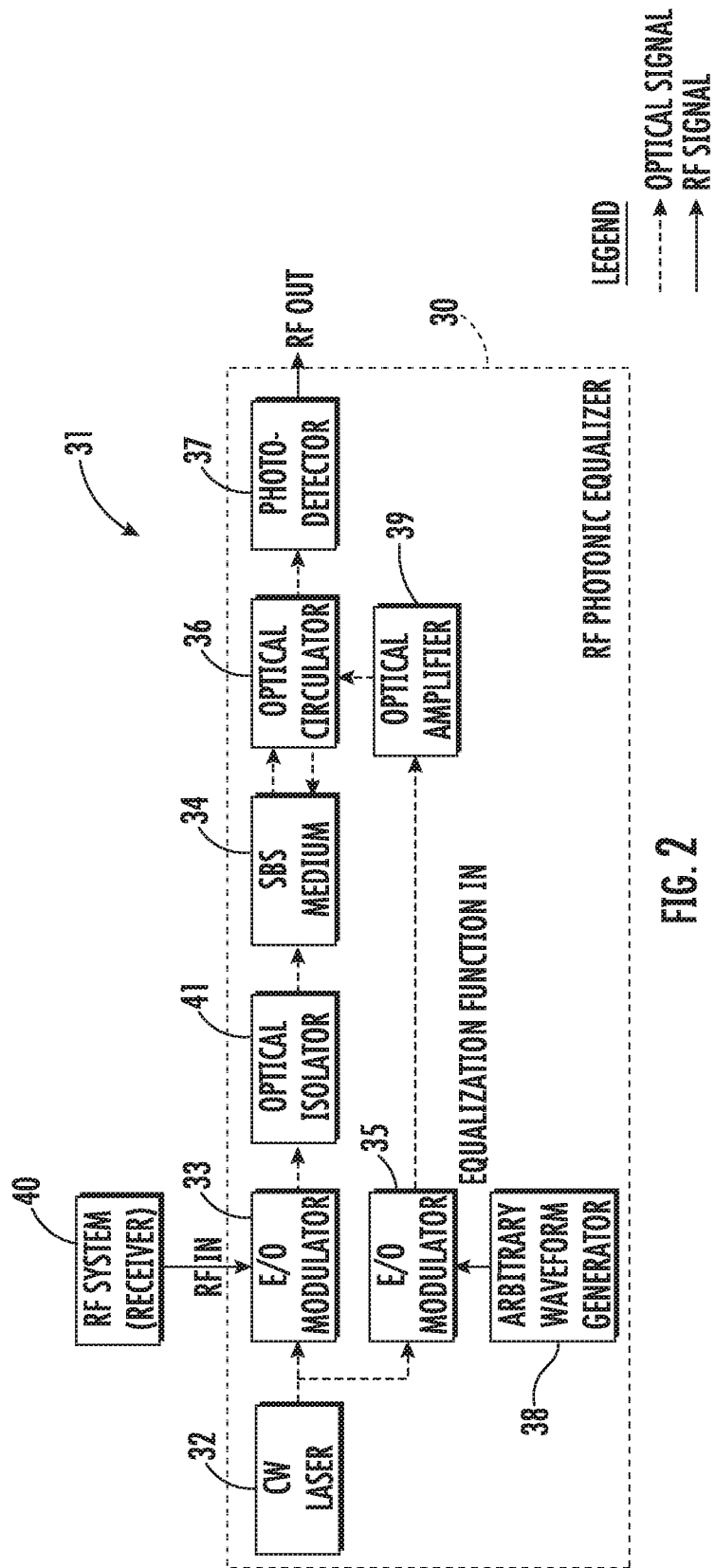
FIG. 2 is a more detailed schematic block diagram of an RF communications system including the RF photonic equalizer of FIG. 1.
Figure 3:
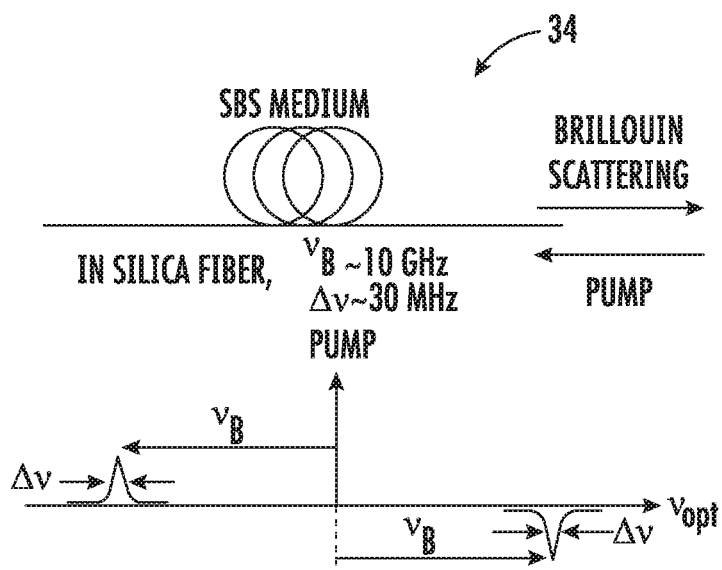
FIGS. 3-7 are a series of schematic diagrams and respective optical signal diagrams illustrating propagation of the input and pump signals through the SBS medium of the photonic equalizer of FIG. 1.
Figure 4:
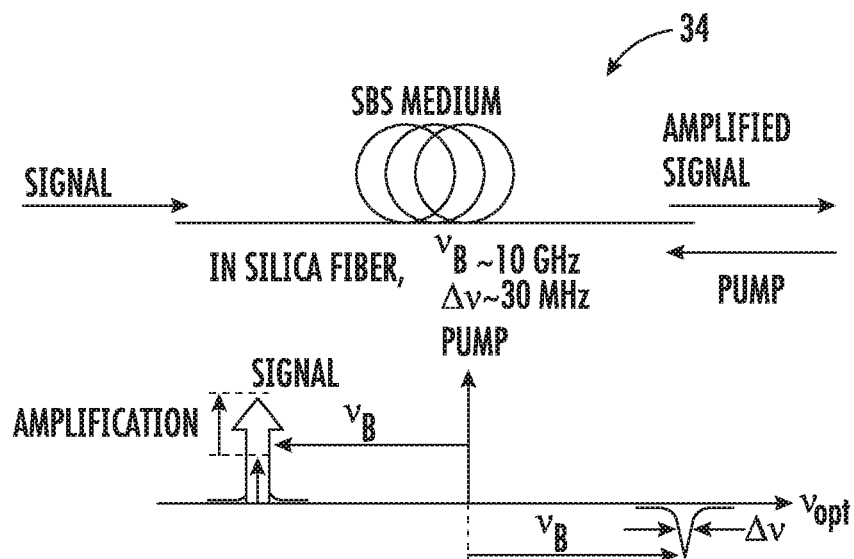
Figure 5:
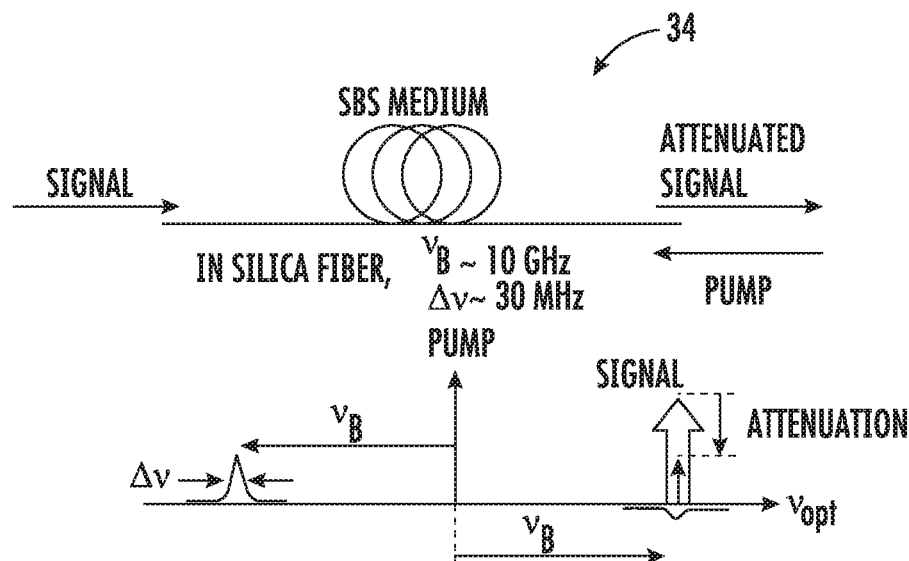
Figure 6:
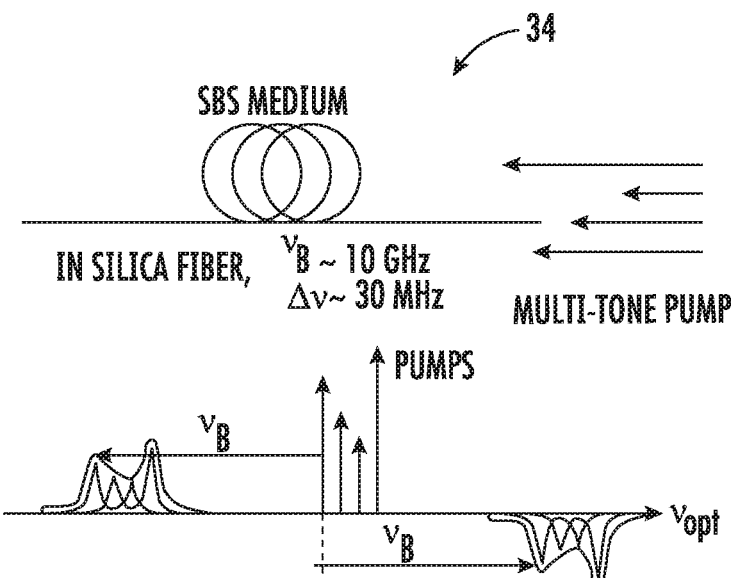
Figure 7:
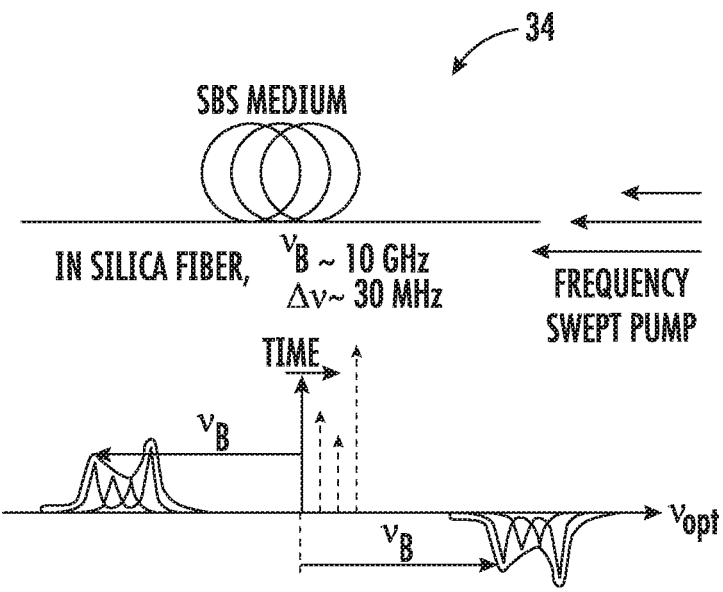

Referring initially to FIGS. 1 and 2, an RF photonic equalizer 30 and associated RF communications system 31 incorporating the RF photonic equalizer are first described. The RF photonic equalizer 30 advantageously applies a photonic equalizing technique based on SBS, a nonlinear optical effect that occurs above certain optical power levels in various media and provides frequency-specific gain or loss bands based on the optical frequency of an input pump signal. More particularly, the equalizer 30 illustratively includes an optical source, here a continuous-wave (CW) laser 32, which generates an optical carrier signal which may optionally be amplified by an optical amplifier (not shown), such as an erbium-doped fiber amplifier (EDFA). By way of example, the CW laser 32 may have a wavelength of 1550 nm, although other wavelengths may be used in different embodiments.

Light from the laser 32 may be divided along two paths by a power divider (not shown). The first path provides an input for a first electro-optic (E/O) modulator 33 configured to modulate the optical carrier based upon an RF input signal, such as from an RF system 40. In the illustrated example, the RF system 40 includes a receiver, but in some embodiments the RF system may also include a transmitter, for example. An SBS medium 34 is illustratively coupled to the first E/O modulator 33, and a second E/O modulator 35 is configured to modulate the optical carrier based upon an equalizing function waveform, as will be discussed further below. By way of example, one or more of the first and second E/O modulators 33, 35 may be Mach-Zehnder modulators. However, other types of E/O modulators may be used in different embodiments.

The equalizer 30 further illustratively includes an optical circulator 36 coupled to the SBS medium 34 and the second E/O modulator 35, and a photodetector 37 coupled to the optical circulator. In some embodiments, an optical isolator 41 may be coupled between the first E/O modulator 33 and the SBS medium 34. The photodetector 37 is configured to generate an RF output signal based upon the equalization function waveform applied to the RF input signal. In the example of FIG. 1, dashed arrows indicate optical signal flow and solid arrows represent RF signal flow.

More particularly, the RF photonic equalizer 30 may include a waveform generator 38 coupled to the second E/O modulator 35 and configured to generate the equalizing function waveform. In accordance with one example, the waveform generator 38 may be an arbitrary waveform generator (AWG) configured to dynamically vary the equalizing function waveform based upon an iterative algorithm, for example. The equalizing function waveform may be formed by combining one or more signals or tones at different frequencies, or a single tone that is frequency swept in time, to use as pump signals in the SBS medium 34. The waveform generator 38 may add an inverse of an RF system frequency response to the RF input signal as a pump signal via the optical circulator 36. The waveform generator 38 may be implemented with a field-programmable gate array (FPGA), application-specific integrated circuit (ASIC), etc.

The pump signal will provide a Brillouin-shifted gain bandwidth whose width is dependent on the SBS medium 34. By varying the pump signal(s), the width, frequency, and shape of the equalizing function waveform may accordingly be set by the waveform generator 38. Further details regarding SBS microwave photonic filtering may be found in D. Marpaung et al., "Low-power, chip-based stimulated Brillouin scattering microwave photonic filter with ultrahigh selectivity," Optica 2, 76-83 (2015), and Y. Stern et al., "Tunable sharp and highly selective microwave-photonic band-pass filters based on stimulated Brillouin scattering," Photon. Res. 2, B18-325 (2014), which are hereby incorporated herein in their entireties by reference.

An optical amplifier 39 may also be included to boost the pump signal above an SBS threshold to create the desired SBS effect, as will be appreciated by those skilled in the art. As noted above, the optically modulated and amplified filter function signal is introduced to the RF signal path via the optical circulator 36, so that it propagates along the same path as the RF signal, but in the opposite direction. This is done to apply optical gain and loss to the spectral response using the SBS medium 34, as will now be discussed further with reference to FIGS. 3-7.

As the distorted RF signal is introduced to the SBS medium 34, so too is the counter-propagating pump signal to generate an attenuated or amplified signal at the input of the photodetector 37. A strong optical pump signal may scatter off an acoustic wave in the propagation medium generated by the pump itself. The acoustic wave acts as a moving grating, effectively leading to a Doppler shift of the scattered light. The scattered light is shifted by the Brillouin frequency (related to the acoustic velocity of the medium) and has a Lorentzian spectrum of bandwidth related to the acoustic wave lifetime of the medium. In silica based standard single mode fiber, the Brillouin frequency is typically ~10 GHz and bandwidth is ~30 MHz at full width half maximum. The aggregate bandwidth may be increased through a multiplicity of pumps or a single pump swept over frequency. Counter-propagating light resonant with the Stokes-shifted Brillouin spectrum may be amplified, while counter-propagating light resonant with the anti-Stokes spectrum may be attenuated. The amount of gain or loss depends on the SBS medium length and material characteristics, pump and probe powers, and relative polarization state of pump and probe.

Figure 8:
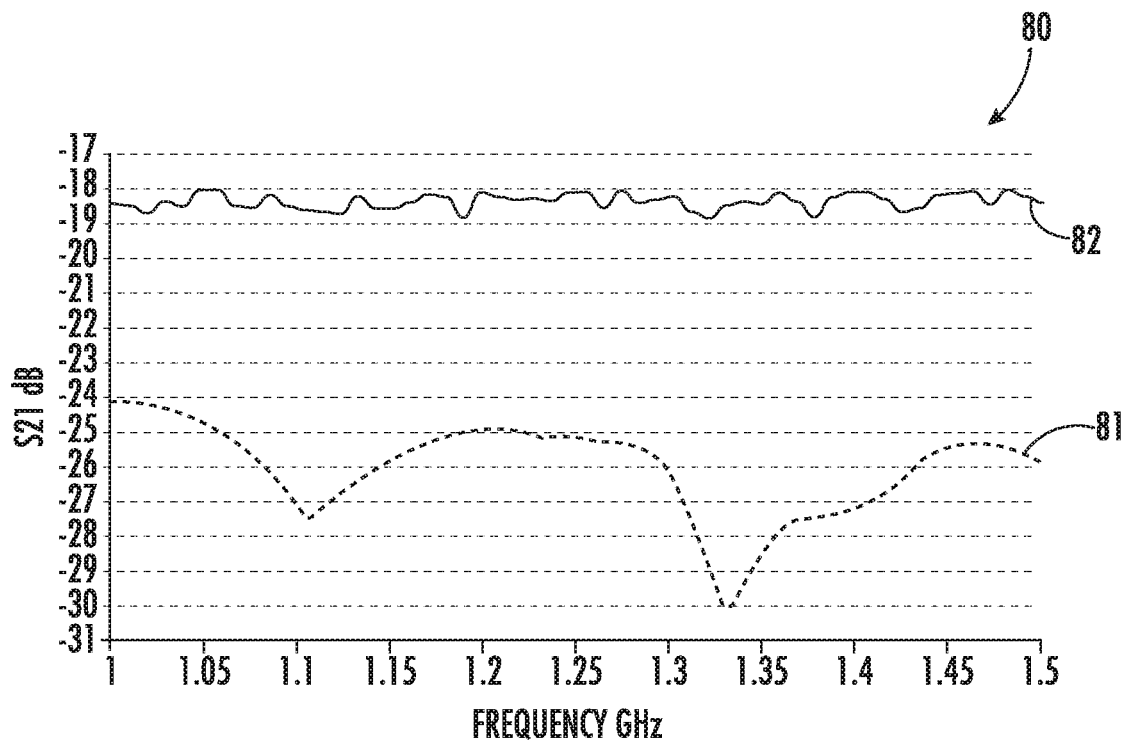
FIG. 8 is a graph including measured plots of RF spectrum output versus frequency before and after equalization using the RF photonic equalizer of FIG. 1, according to an example implementation.

An example RF signal equalization measurement using the above-described approach is demonstrated in the graph 80 of FIG. 8. In the illustrated example, the RF signal plot 81 corresponds to the original distorted RF signal with no SBS equalization applied. The RF signal plot 82 corresponds to the RF signal after equalization by the equalizer 30, which applies the above-described photonic equalization across the illustrated signal range. The resulting signal has a significantly flattened frequency response which advantageously provides a gain flatness within +/−1 dB.

Figure 9:
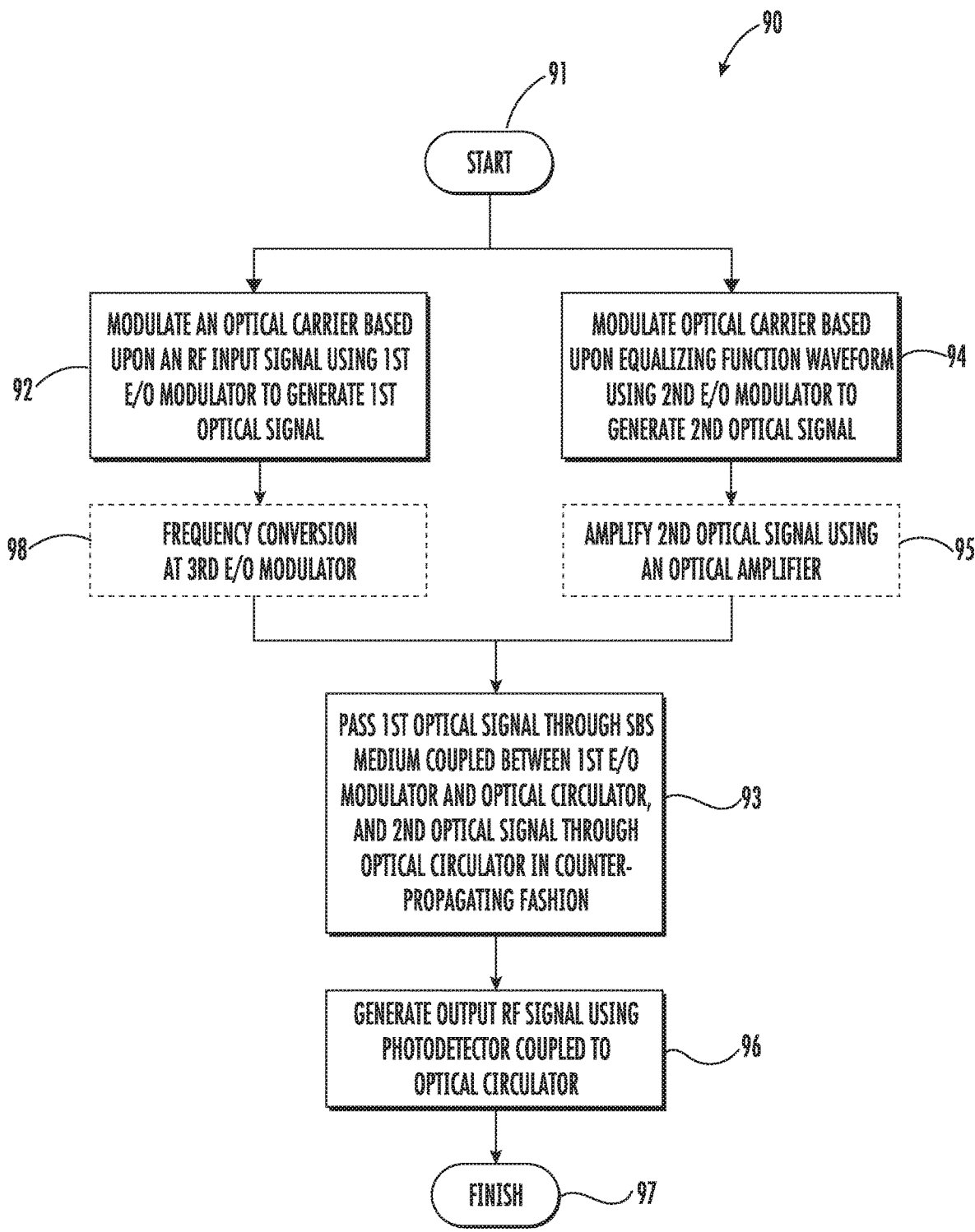
FIG. 9 is a flowchart illustrated method aspects associated with the RF photonic equalizer of FIG. 1.

Operation of the equalizer 30 will be further understood with reference to the flow diagram 90 of FIG. 9, which begins at Block 91. The CW laser 32 generates the optical carrier, which is optically split and fed into the E/O modulators 33, 35. The signal path modulator 33 converts the distorted electrical signal from the RF system 40 into the optical domain (Block 92), manifesting as optical sidebands off of the carrier. This signal passes through the optical isolator 36 and into the SBS gain medium 34, at Block 93, where the interaction of the RF input signal and the pump occur. The pump path modulator 35 performs the same E/O conversion on the arbitrarily generated equalization function waveform (Block 94), which is programmed to compensate for the distortion. This is (optionally) then optically amplified by the amplifier 39 (Block 95) to stimulate Brillouin scattering in the SBS medium 34, as noted above. The circulator 36 serves to counter-propagate the pump signal into the SBS medium 34 while the RF signal is passing in the propagating direction. The resulting SBS from the pump may be positioned in frequency to add optical gain or optical loss to the signal in the propagating direction, thus equalizing the signal. The optical signal is converted into an electrical signal via the photodetector 37, at Block 96, which illustratively concludes the method of FIG. 9 (Block 97).

The equalizer 30 advantageously provides for an arbitrarily configurable photonic system which adds the inverse of an RF system frequency response to provide an equalized total system frequency response. Yet, the equalizer 30 is an all analog equalizer that advantageously has a relatively high resolution (e.g., <30 MHz), wide operating bandwidth (e.g., DC-110 GHz), and wide instantaneous bandwidth (IBW) (e.g., >15 GHz). Moreover, the equalizer 30 is arbitrarily and dynamically reconfigurable, has significant amplitude adjustability (e.g., >50 dB), and may advantageously provide dynamic spectral manipulation at sub-microsecond timescales.

Figure 10:
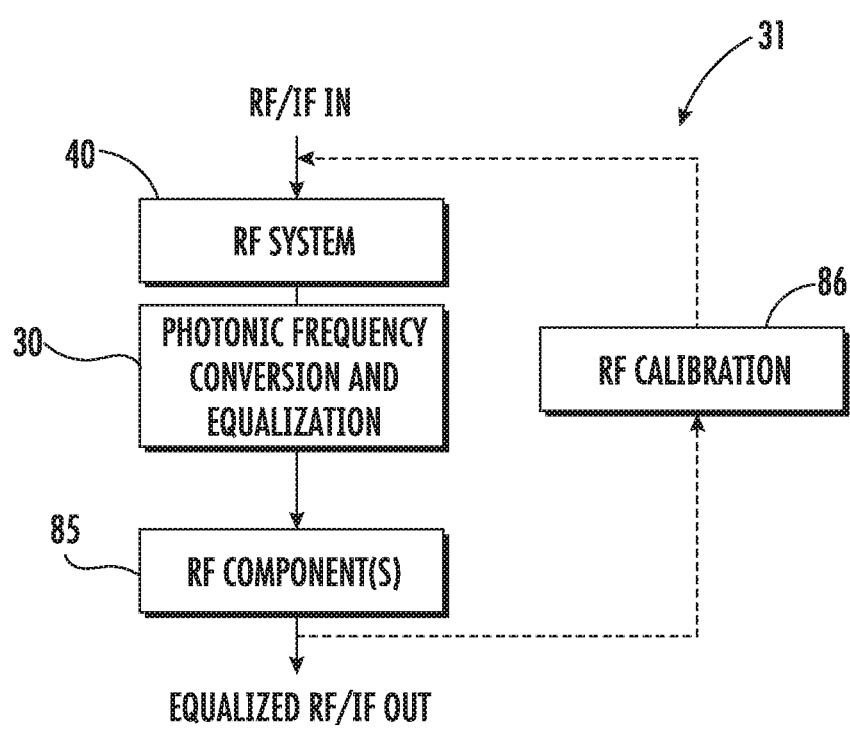
FIG. 10 is a schematic block diagram of another embodiment of the system of FIG. 2, according to an example implementation.

Another example implementation of the system 31 is shown in FIG. 10. In this configuration, equalization is performed based upon the output of one or more RF components 85 upstream or downstream from the RF photonic equalizer 30. By way of example, such RF components 85 may include cables, filters, amplifiers, etc. An RF calibration system or device 86, such as a network analyzer, may be coupled between the input to the RF system 40 and the output of the RF component(s) 85 as shown. By way of example, this may be done as a calibration step or during the manufacturing process, and the RF calibration device 86 may be removed before the system 31 is put into service, although in some embodiments an RF calibration device may also be used in the field as well.

A typical Extremely High Frequency (EHF), i.e. 30 to 300 GHz, communication system operating at this band may have some drawbacks. For example, transmission of the signals over coaxial cable may incur large attenuation effects. Moreover, in applications where RF devices are used, the size, weight, and power (SWaP) of the components may increase to undesirable levels. Moreover, downstream receiver processing, such as downconverting, and signal addressing may be difficult.

One approach to these drawbacks in EHF communication systems may comprise the use of optical components for processing components. An advantage of such systems is the ability to transmit EHF signals from a remote location without the degradation of the signal incumbent in RF applications.

For example, as disclosed in U.S. Pat. No. 5,710,651 to Logan, Jr., an EHF communication system comprises a remote antenna station, a transmitter/receiver station, and an optical fiber coupling the stations together. These stations comprise photodiodes for converting the transmitted optical signal to an electrical signal, and lasers paired with optical modulators for converting the received EHF signal to an optical signal.

Also, in EHF applications, it may be helpful to provide gain equalization that can be dynamically reconfigured. Such an equalizer would need to be rapidly configured, tunable over a wide frequency range, and adjustable in both the center frequency and bandwidth. Moreover, in some EHF frequency conversion applications, gain flatness requirements may be difficult to achieve with typical approaches. The present disclosure provides an approach to these issues in the following.

Figure 11:
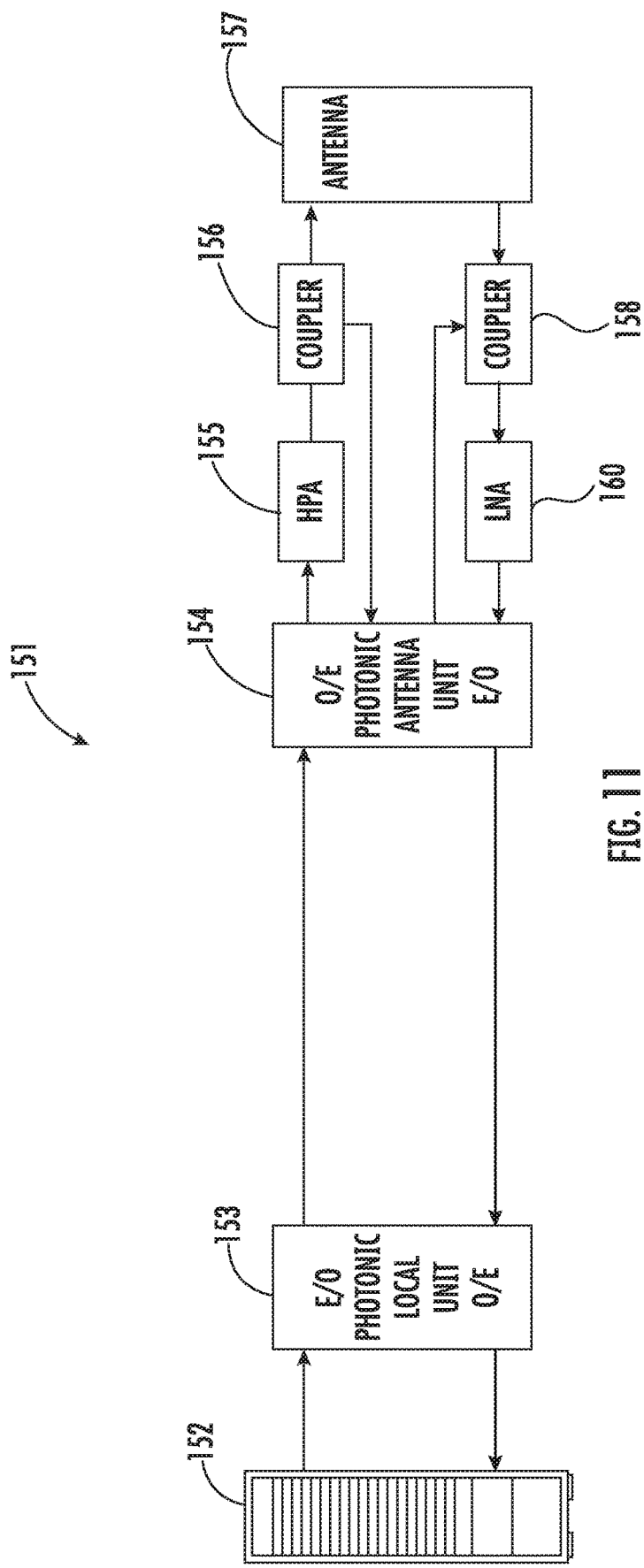
FIG. 11 is a schematic diagram of an RF system, according to an example embodiment.

Referring now to FIG. 11, an RF system 151 according to the present disclosure is now described. The RF system 151 applies the SBS equalization features of FIGS. 1-10 for frequency conversion applications, for example, remoting of EHF signals.

The RF system 151 illustratively includes a modem 152 configured to generate a transmit RF signal and process a receive RF signal. The RF system 151 comprises a photonic local unit 153 configured to convert the transmit RF signal into a transmit optical signal, and convert a receive optical signal into the receive RF signal.

The RF system 151 illustratively includes a photonic antenna unit 154 configured to convert an RF antenna signal into the receive optical signal, and convert the transmit optical signal into the transmit RF signal. The RF system 151 illustratively includes a high power amplifier 155 configured to amplify the transmit RF signal, an antenna 157, a first coupler 156 configured to route the amplified RF signal to the antenna, a second coupler 158 configured to route the receive RF signal from the antenna, and a low noise amplifier 160 configured to amplify the receive RF signal before conversion in the photonic antenna unit 154.

Figure 12:
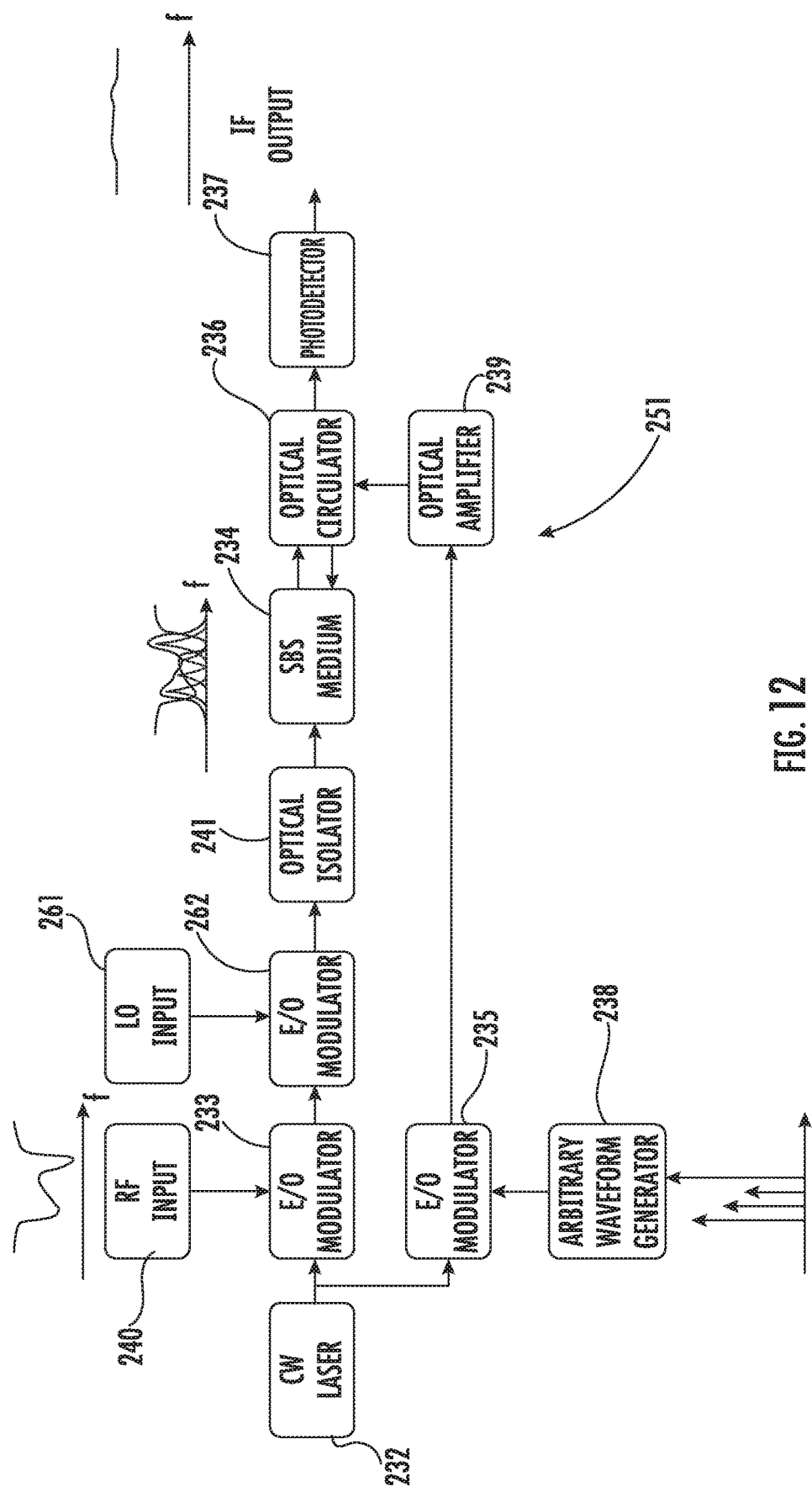
FIG. 12 is a schematic diagram of an RF frequency converter with SBS equalization, according to an example embodiment.
Figure 15A:
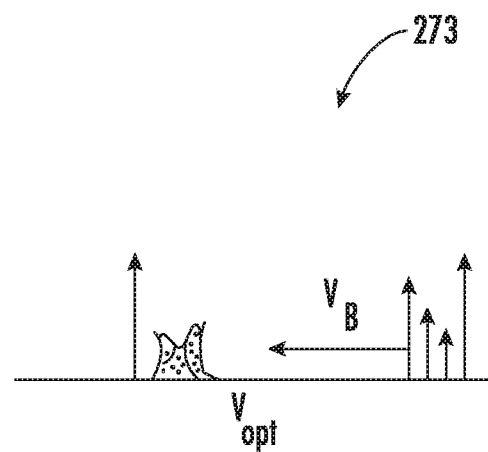
Figure 15B:
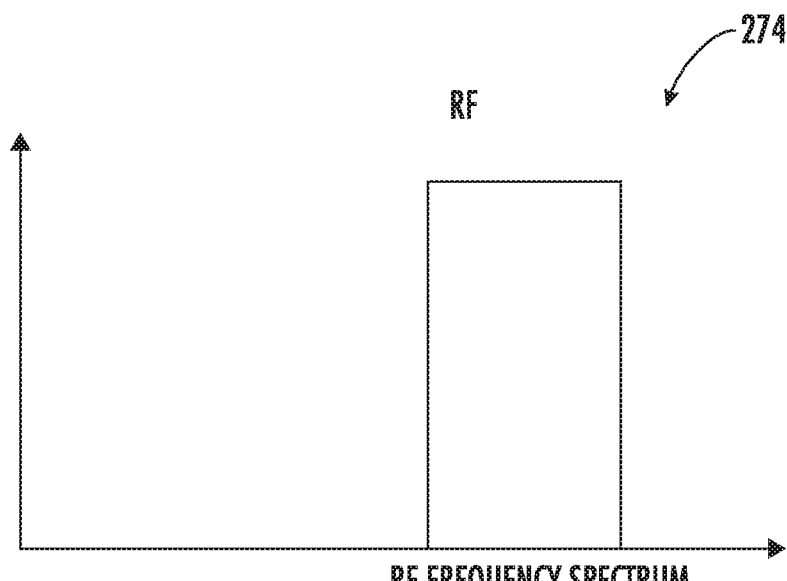
Figure 16A:
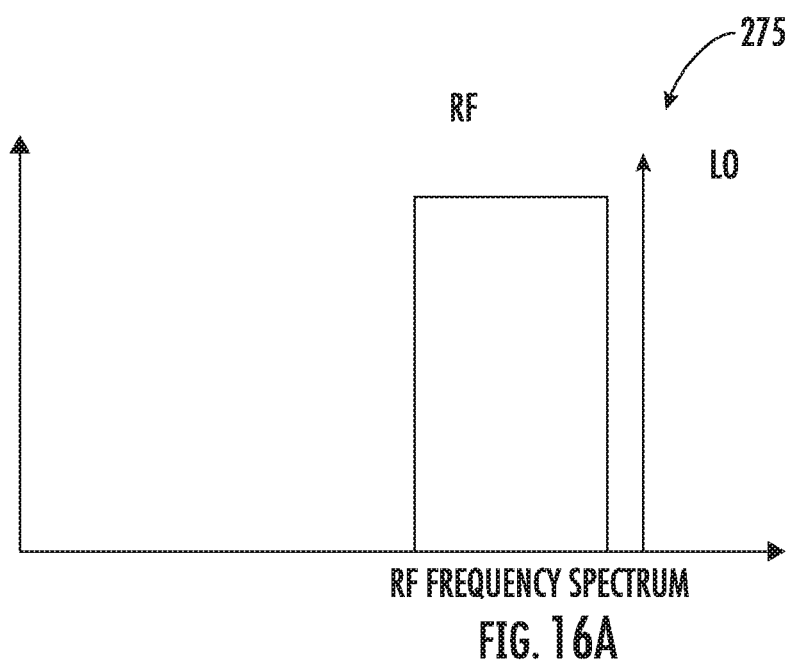
Figure 16B:
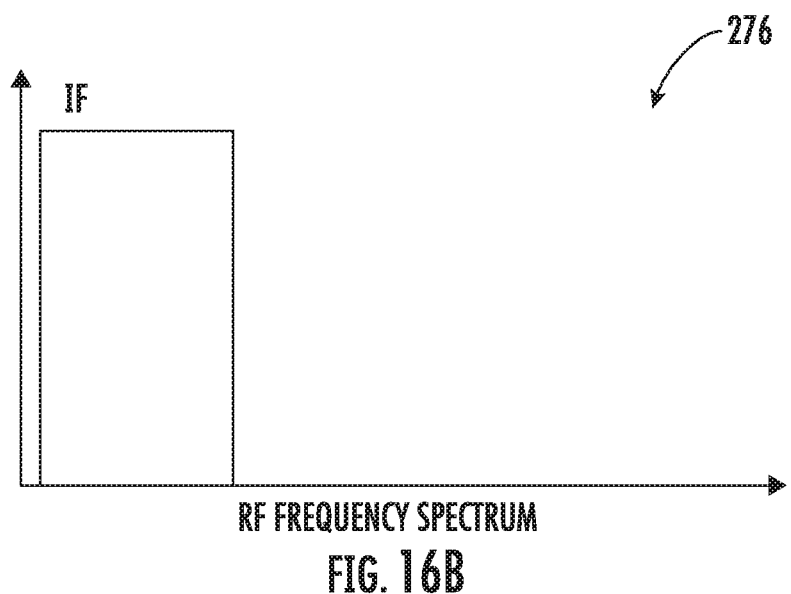

Referring now additionally to FIG. 12, an RF frequency converter 251 illustratively includes an RF input module 240 configured to generate an RF input signal. For example, the RF input module 240 may comprise an RF antenna. The RF frequency converter 251 illustratively includes a first E/O modulator 233 configured to modulate an optical carrier signal based upon the RF input signal having a first frequency, and a SBS medium 234 coupled to the first E/O modulator. The RF frequency converter 251 illustratively includes an optical source 232 configured to generate the optical carrier signal. For example, in the illustrated embodiment, the optical source 232 comprises a CW laser source.

The RF frequency converter 251 illustratively includes a second E/O modulator 235 configured to modulate the optical carrier signal based upon an equalizing function waveform. The RF frequency converter 251 illustratively includes a waveform generator 238 coupled to the second E/O modulator 235 and configured to generate the equalizing function waveform. The waveform generator 238 is configured to dynamically vary the equalizing function waveform. The waveform generator 238 is configured to add an inverse of an RF system frequency response to the RF input signal.

The RF frequency converter 251 illustratively includes a third E/O modulator 262 coupled between the first E/O modulator 233 and the SBS medium 234. The third E/O modulator 262 is configured to modulate the optical carrier signal with a reference signal. The RF frequency converter 251 illustratively includes a local oscillator 261 configured to generate the reference signal comprising a local oscillator signal.

The RF frequency converter 251 illustratively includes an optical isolator 241 coupled between the third E/O modulator 262 and the SBS medium 234. The RF frequency converter 251 illustratively includes an optical circulator 236 coupled to the SBS medium 234 and the second E/O modulator 235, and an optical amplifier 239 coupled between the second E/O modulator 235 and the optical circulator.

The RF frequency converter 251 illustratively includes a photodetector 237 coupled to the optical circulator 236 and configured to generate an equalized RF output signal comprising a replica of the RF input signal at a second frequency based upon the reference signal. In particular, the photodetector 237 is configured to generate the equalized RF output signal based upon the equalization function waveform applied to the RF input signal.

The second frequency is different than the first frequency, i.e. a frequency conversion operation. In some embodiments, the first frequency may be greater than the second frequency. In other words, the RF frequency converter 251 is operating as a downconverter. In other embodiments, the first frequency may be less than the second frequency. Here, the RF frequency converter 251 is operating as an upconverter.

Also, the RF frequency converter 251 may, in some embodiments, include a first optical filter (not shown) coupled between the third E/O modulator 262 and the photodetector 237. The RF frequency converter 251 may, in some embodiments, comprise a second optical filter (not shown) coupled between the optical amplifier 239 and the second E/O modulator 235.

Referring again to FIG. 9, another aspect is directed to a method for RF frequency converting. The method includes modulating, with a first E/O modulator 233, an optical carrier signal based upon an RF input signal having a first frequency, and modulating, with a second E/O modulator 235, the optical carrier signal based upon an equalizing function waveform. (Blocks 91-92, 94). The method comprises modulating, with a third E/O modulator 262 coupled to the first E/O modulator 233, the optical carrier signal with a reference signal. (Block 98). The method further comprises passing a modulated optical carrier signal, from the third E/O modulator 262, through a SBS medium 234, and generating, with a photodetector 237 coupled to an optical circulator 236, an equalized RF output signal comprising a replica of the RF input signal at a second frequency based upon the reference signal. (Blocks 93, 96, 97).

Referring now additionally to FIGS. 13A-16B, signal propagation and operation of the RF frequency converter 251 are now described. In diagram 270, the optical carrier signal is shown as generated by the optical source 232, and diagram 271 shows the RF input signal as generated by the RF input module 240. Once the RF input signal and the optical carrier signal are combined in the first E/O modulator 233, diagram 272 shows the resulting post-detection RF frequency spectrum of the modulated signal. As can be appreciated, the post-detection RF frequency spectrum of the modulated signal is not flat due to aforementioned frequency response of components.

Diagram 273 shows the combination of the equalizing function waveform from the waveform generator 238 combined with the RF input signal in the SBS medium 234. Diagram 274 shows the resulting post-detection RF frequency spectrum of the combined signal. Since the equalizing function waveform has been added, the post-detection RF frequency spectrum is equalized, i.e. flat.

Diagram 275 is the post-detection RF frequency spectrum after the modulated signal from the first E/O modulator 233 is modulated with the reference signal in the third E/O modulator 262. Diagram 276 is the post-detection RF frequency spectrum of the modulated signal RF output signal at the intermediate frequency.

Figure 17:
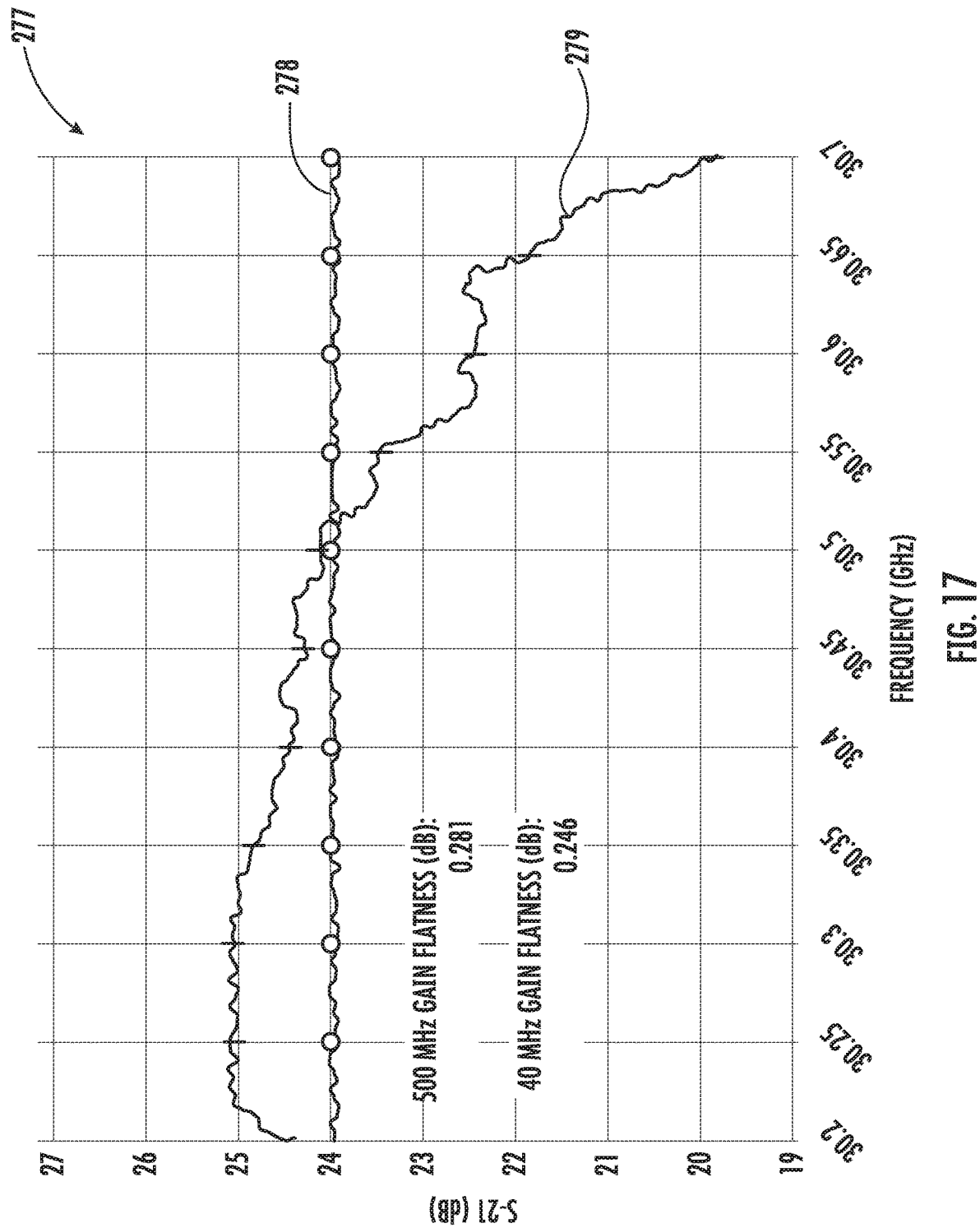
FIG. 17 is a diagram of gain performance for RF photonic uplink equalization in the RF frequency converter of FIG. 12.
Figure 18B:
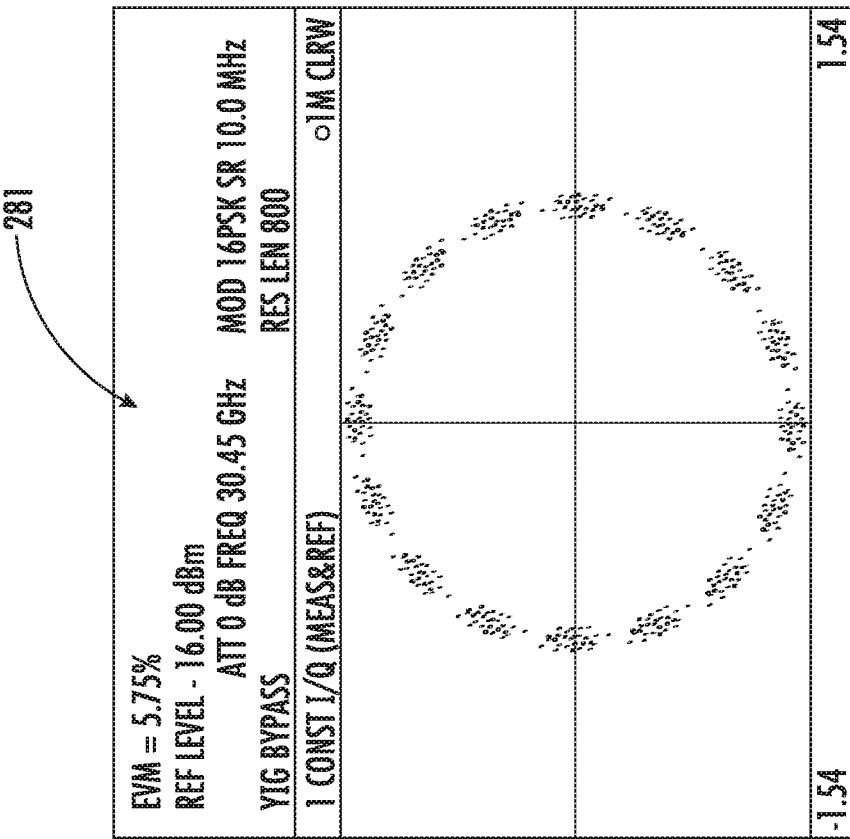
FIGS. 18A-18B are constellation diagrams in the RF frequency converter of FIG. 12 with and without RF photonic uplink equalization, respectively.
Figure 18A:
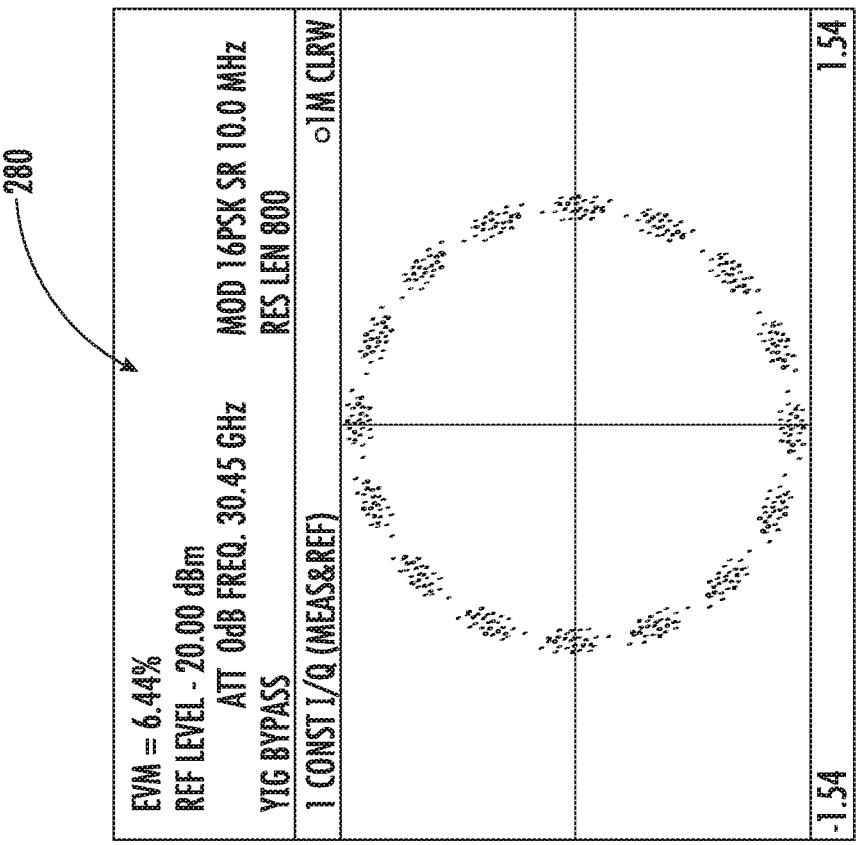
Figure 19:
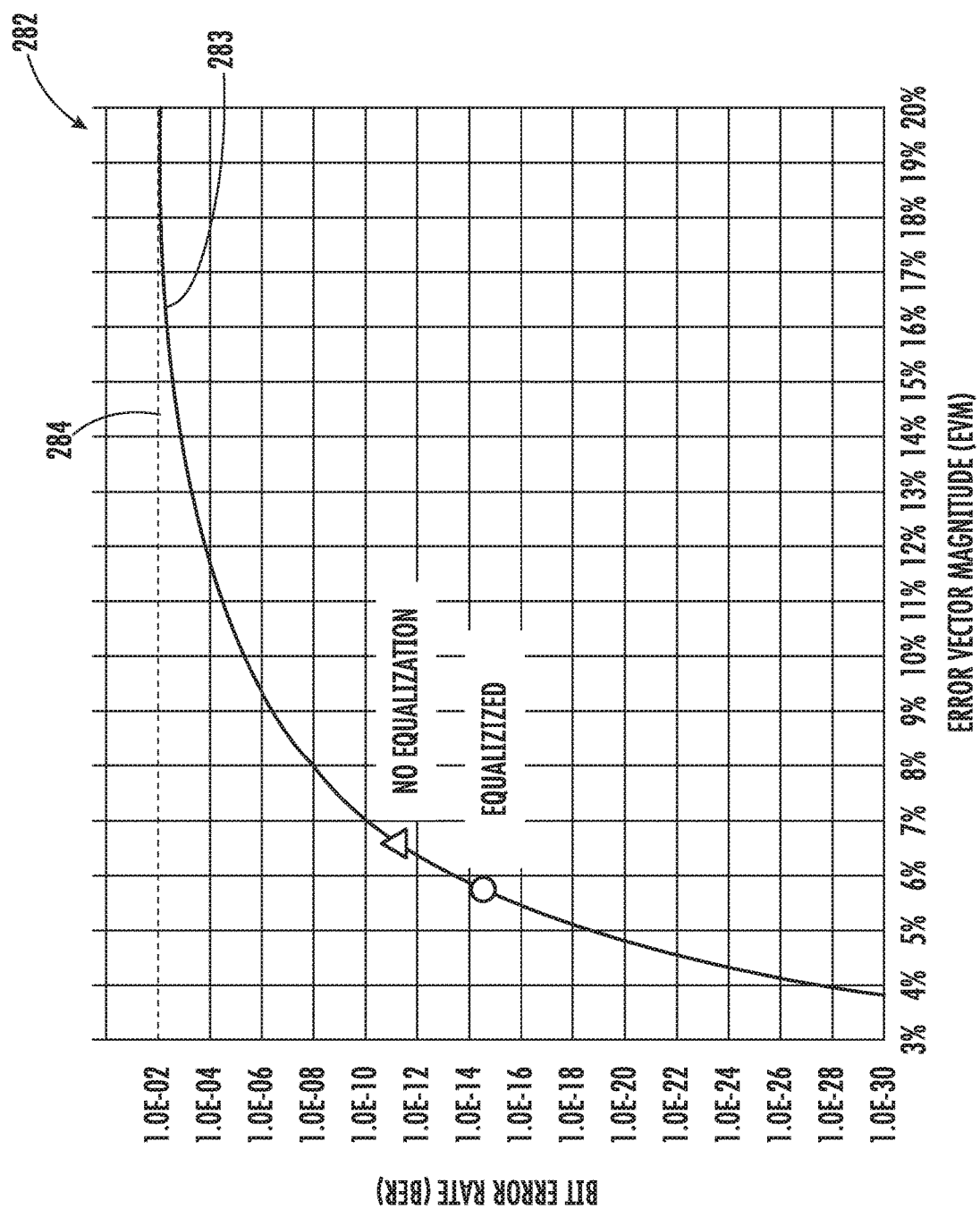
FIG. 19 is a diagram of bit error performance versus error vector magnitude for RF photonic uplink equalization in the RF frequency converter of FIG. 12.

Referring now additionally to FIGS. 17-19, several aspects of performance of the RF frequency converter 251 are now described. Diagram 277 shows gain performance for RF photonic uplink equalization in the RF frequency converter 251 in a bandwidth of 500 MHz and 40 MHz, respectively being 0.281 dB and 0.246 dB. In particular, curves 278 and 279 show gain profiles for the equalized and unequalized signals, respectively, in the RF frequency converter 251.

Constellation diagrams 280 and 281 show system performance for the unequalized and equalized signals, respectively, in the RF frequency converter 251. Constellation diagram 280 shows an error vector magnitude of 6.44%, and advantageously, constellation diagram 281 shows an error vector magnitude of 5.75%.

Diagram 282 shows error rate performance for the equalized and unequalized signals in the RF frequency converter 251. Curve 283 shows bit error rate performance for a 16-phase shift keying (PSK) modulation signal as error vector magnitude varies. Curve 284 shows a hard decision forward error correction (HD-FEC) threshold. In particular, the equalized data point (x-mark) demonstrates a lower error rate than the unequalized data point (triangle mark).

Advantageously, the RF frequency converter 251 may provide an inherently wideband approach that is tunable across frequency bands with large IBW. The RF frequency converter 251 may also provide increased dynamic range, and increased frequency resolution. Moreover, the RE frequency converter 251 is dynamically reconfigurable, and has tunable pumps. Moreover, as shown in the above performance measurements, the RE frequency converter 251 may provide for a flat gain profile with net improvement in the data channel error characteristics.

Other features relating to frequency conversion and equalization are disclosed in U.S. Pat. No. 8,842,992 to Middleton et al. and patent application Ser. No. 15/958,397 to Middleton et al., which are incorporated herein by reference in its entirety.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A radio frequency (RF) frequency converter with equalization, the RF frequency converter comprising:
   a first electro-optic (E/O) modulator configured to modulate an optical carrier signal based upon an RF input signal having a first frequency;
   a stimulated Brillouin scattering (SBS) medium coupled to said first E/O modulator;
   a second E/O modulator configured to modulate the optical carrier signal based upon an equalizing function waveform;
   a third E/O modulator coupled between said first E/O modulator and said SBS medium, said third E/O modulator configured to modulate the optical carrier signal with a reference signal;
   an optical circulator coupled to said SBS medium and the second E/O modulator; and
   a photodetector coupled to the optical circulator and configured to generate an equalized RF output signal comprising a replica of the RF input signal at a second frequency based upon the reference signal.

2. The RF frequency converter of claim 1 wherein the photodetector is configured to generate the equalized RF output signal based upon the equalization function waveform applied to the RF input signal.

3. The RF frequency converter of claim 1 further comprising a waveform generator coupled to the second E/O modulator and configured to generate the equalizing function waveform.

4. The RF frequency converter of claim 3 wherein the waveform generator is configured to dynamically vary the equalizing function waveform.

5. The RF frequency converter of claim 3 wherein the waveform generator is configured to add an inverse of an RF system frequency response to the RF input signal.

6. The RF frequency converter of claim 1 wherein the first frequency is greater than the second frequency.

7. The RF frequency converter of claim 1 further comprising an optical isolator coupled between the third E/O modulator and said SBS medium.

8. The RF frequency converter of claim 1 further comprising an optical amplifier coupled between the second E/O modulator and the optical circulator.

9. The RF frequency converter of claim 1 further comprising a laser source configured to generate the optical carrier signal.

10. A radio frequency (RF) system comprising:
    an RF antenna configured to generate an RF input signal having a first frequency; and
    an RF frequency converter with equalization coupled to said RF antenna and comprising
       a first electro-optic (E/O) modulator configured to modulate an optical carrier signal based upon the RF input signal,
       a stimulated Brillouin scattering (SBS) medium coupled to said first E/O modulator,
       a second E/O modulator configured to modulate the optical carrier signal based upon an equalizing function waveform,
       a third E/O modulator coupled between said first E/O modulator and said SBS medium, said third E/O modulator configured to modulate the optical carrier signal with a reference signal,
       an optical circulator coupled to said SBS medium and the second E/O modulator, and
       a photodetector coupled to the optical circulator and configured to generate an equalized RF output signal comprising a replica of the RF input signal at a second frequency based upon the reference signal.

11. The RF system of claim 10 wherein the photodetector is configured to generate the equalized RF output signal based upon the equalization function waveform applied to the RF input signal.

12. The RF system of claim 10 further comprising a waveform generator coupled to the second E/O modulator and configured to generate the equalizing function waveform.

13. The RF system of claim 12 wherein the waveform generator is configured to dynamically vary the equalizing function waveform.

14. The RF system of claim 12 wherein the waveform generator is configured to add an inverse of an RF system frequency response to the RF input signal.

15. The RF system of claim 10 wherein the first frequency is greater than the second frequency.

16. The RF system of claim 10 further comprising an optical isolator coupled between the third E/O modulator and said SBS medium.

17. A method for radio frequency (RF) frequency converting with equalization, the method comprising:
    modulating, with a first electro-optic (E/O) modulator, an optical carrier signal based upon an RF input signal having a first frequency;
    modulating, with a second E/O modulator, the optical carrier signal based upon an equalizing function waveform;
    modulating, with a third E/O modulator coupled to the first E/O modulator, the optical carrier signal with a reference signal;
    passing a modulated optical carrier signal, from the third E/O modulator, through a stimulated Brillouin scattering (SBS) medium; and
    generating, with a photodetector coupled to an optical circulator, an equalized RF output signal comprising a replica of the RF input signal at a second frequency based upon the reference signal.

18. The method of claim 17 wherein the generating is based upon the equalization function waveform applied to the RF input signal.

19. The method of claim 17 further comprising generating, with a waveform generator coupled to the second E/O modulator, the equalizing function waveform.

20. The method of claim 19 wherein the generating of the equalizing function waveform comprises dynamically varying the equalizing function waveform.

21. The method of claim 19 wherein the generating of the equalizing function waveform comprises adding an inverse of an RF system frequency response to the RF input signal.

* * * * *